(12) United States Patent
Mauritz (10) Patent No.: US 6,504,526 B1
(45) Date of Patent: Jan. 7, 2003

(54) WIRELESS POINTING SYSTEM (75) Inventor: Karl H. Mauritz, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/185,722

(22) Filed: Nov. 3, 1998

(51) Int. Cl.[7] .............................................. G09G 5/08
(52) U.S. Cl. ...................... 345/158; 348/734; 250/200; 250/206.1; 345/166
(58) Field of Search ........................ 345/167, 168–169, 345/158, 156, 157; 348/734; 250/200, 206.1, 559.2, 559.39

(56) References Cited

U.S. PATENT DOCUMENTS

| | | | | |
|---|---|---|---|---|
| 4,763,291 A | * | 8/1988 | Schwaber | 364/704 |
| 4,924,216 A | * | 5/1990 | Leung | 340/709 |
| 5,554,980 A | * | 9/1996 | Hashimoto et al. | 340/825.72 |
| 5,598,187 A | * | 1/1997 | Ide et al. | 345/158 |
| 5,774,113 A | * | 6/1998 | Barnes et al. | 345/156 |
| 5,825,350 A | * | 10/1998 | Case, Jr. et al. | 345/163 |
| 5,867,146 A | * | 2/1999 | Kim et al. | 345/158 |
| 5,877,745 A | * | 3/1999 | Beeteson et al. | 345/156 |
| 5,898,421 A | * | 4/1999 | Quinn | 345/156 |
| 5,926,168 A | * | 7/1999 | Fan | 345/158 |
| 5,949,403 A | * | 9/1999 | Umeda et al. | 345/158 |
| 5,952,996 A | * | 9/1999 | Kim et al. | 345/158 |
| 5,986,644 A | * | 11/1999 | Herder et al. | 345/158 |
| 5,999,167 A | * | 12/1999 | Marsh et al. | 345/158 |
| 6,069,594 A | * | 5/2000 | Barnes et al. | 345/7 |
| 6,137,473 A | * | 10/2000 | Cortopassi et al. | 345/156 |
| 6,184,863 B1 | * | 2/2001 | Sibert et al. | 345/156 |
| 6,229,526 B1 | * | 5/2001 | Berstis | 345/158 |
| 6,292,172 B1 | * | 9/2001 | Makhlouf | 345/157 |
| 6,359,610 B1 | * | 3/2002 | Shah et al. | 345/156 |

OTHER PUBLICATIONS

The New Standard for Infrared Bi–Directional Command and Control Devices, 1–3, printed from web site: http://www.irbus.org, dated at least as early as Dec. 14, 1998.

IR Remote System, 1–5, printed from web site http://web2.airmail.net, dated at least as early as Dec. 14, 1998.

* cited by examiner

Primary Examiner—Richard Hjerpe
Assistant Examiner—Kimnhung Nguyen
(74) Attorney, Agent, or Firm—Trop, Pruner & Hu, P.C.

(57) ABSTRACT

A wireless pointing device may have a motion circuit to indicate when the wireless pointing device is in motion, and a transmitter to transmit a unique signal indicative of the wireless pointing device's motion is described. A wireless receiver may have a control circuit to generate control signals based on a classification of signals received from the wireless pointing device, and an analysis circuit to determine a characteristic of the received signals is also described. Signal classification may include determination of whether the received signal indicate motion of the wireless pointing device and/or whether a wireless pointing device control (a button or switch, for example) has been activated. Signal characteristics may include motion and/or the speed of motion of the wireless pointing device.

15 Claims, 6 Drawing Sheets

WIRELESS POINTING SYSTEM

BACKGROUND

The invention relates generally to pointing devices and, more particularly, to wireless pointing devices.

Common computer system pointing devices include the mouse, joystick, and trackball. Of these, the most widely used is the mouse. A typical mouse includes two or three buttons and a steel ball coated with gum or plastic which rotates as the mouse is moved. The ball's motion is typically transmitted mechanically to two rollers arranged perpendicularly to one another. The rollers convert the mouse's movement in the X and Y directions into a rotation of two slotted disks. The disks, in turn, alternately open or close a photosensor assembly. The number of photosensor assembly open and close operations may be used to unambiguously determine the mouse's motion in the X and Y directions, while the number of open and close operations in a specified time period may provide an indication of the mouse's speed of motion.

Pointing devices typically pass data describing the amount of their motion as well as whether the user has activated one or more buttons to a host computer system in the form of a data packet. For example, a mouse data packet may indicate that the mouse has moved a-units in the X direction, b-units in the Y direction (a and b may be positive or negative values), and that it's left button is depressed. Other pointing devices, such as an optical mouse, may use optical sensors and a specially patterned mouse pad to detect the mouse's motion. (The specially patterned mouse pad is used to allow the mouse's internal logic circuitry to determine its direction and speed of motion.) Data packets are generally transmitted to the host computer system (where they may be processed by a software mouse driver routine) via a cable or, alternatively, an infrared or radio frequency link.

Current pointing devices require the user to mentally transform motion of the pointing device in one plane (typically the plane of the user's desk or keyboard—the surface on which the pointing device is moved) to motion in a second plane (the user's display). It Is awkward and unnatural for most individuals not to point at the object being moved. Thus, it would be beneficial to provide a pointing mechanism that allows a user to point at the device (e.g., a computer display) being manipulated.

SUMMARY

In one embodiment the invention provides a wireless pointing device having a motion circuit to indicate when the wireless pointing device is in motion, and a transmitter coupled to the motion circuit to transmit a unique signal indicative of the wireless pointing device's motion.

In another embodiment, the invention provides a receiver to receive signals from a wireless pointing device, a control circuit to generate control signals based on a classification of the received signals, and an analysis circuit, operatively coupled to the receiver and the control circuit, to determine a characteristic of the received signals. Signal classification may include determination of whether the received signal indicates motion of the wireless pointing device and/or whether a wireless pointing device control (a button or switch, for example) has been activated. Signal characteristics may include motion and/or the speed of motion of the wireless pointing device.

DETAILED DESCRIPTION

Techniques (including methods and devices) to provide wireless pointing device capability are described. The following embodiments, described in terms of an infrared (IR) pointing system, are illustrative of the inventive concept only and are not to be considered limiting in any respect.

Figure 1:
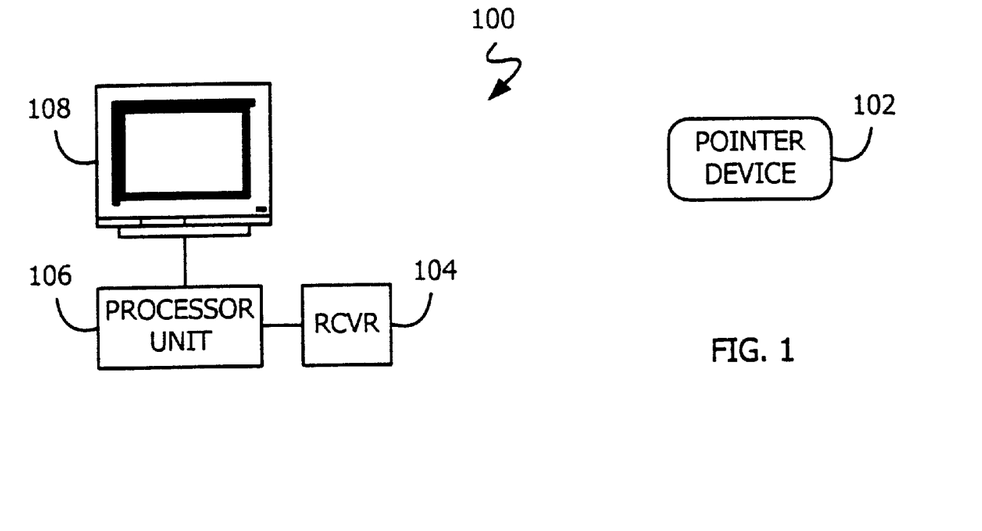
FIG. 1 shows a computer system employing a wireless pointing device in accordance with one embodiment of the invention.

Referring to FIG. 1, an illustrative computer system 100 having pointing device 102, receiver (RCVR) unit 104, processor unit 106, and display unit 108 is shown. Processor unit 106 typically includes a host processor, motherboard, and input-output (I/O) capability. Illustrative host processors include the PENTIUM® family of processors and the 80X86 families of processors from Intel Corporation. Illustrative display units include cathode ray tube (CRT) and liquid crystal display (LCD) units.

Figure 2:
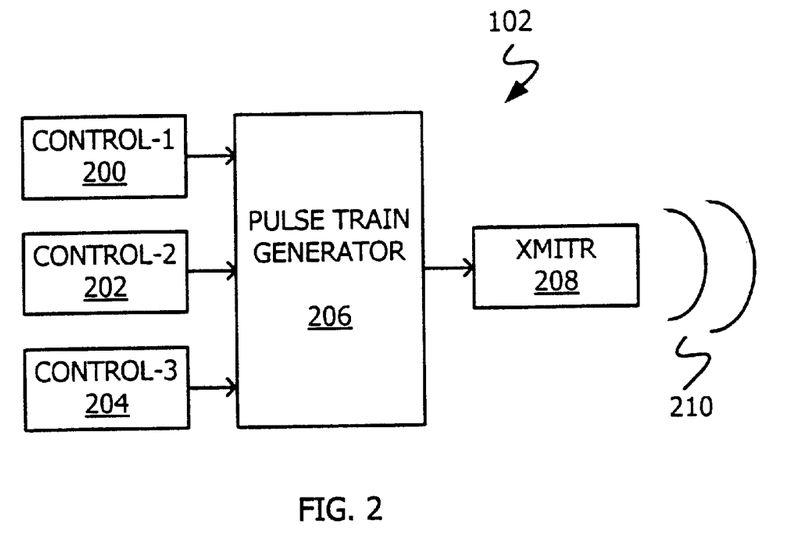
FIG. 2 shows a block diagram of a wireless pointing device in accordance with one embodiment of the invention.

Referring to FIG. 2, one pointing device 102 in accordance with the invention may include a plurality of controls 200, 202, and 204 (e.g., buttons or switches), pulse train generator 206, and transmitter 208. In one embodiment, control-1 200 may be automatically activated to indicate pointing device 102 is being moved, for example, by a motion sensor internal to pointing device 102. (Pointing device 102 may be moved horizontally, vertically, or via rotation by a user.) Controls 2 and 3 (202 and 204 respectively) may be manually activated by a user to, for example, indicate the activation of a left or right mouse button. Pulse train generator 206 may generate unique streams of digital pulses (of arbitrary length such as, for example, 10 pulses) to indicate which one, or combination of controls are activated. For example, activation of control-1 200 may result in pulse generator 206 generating a first unique pulse train (e.g., <1 1 0 0 1 1 0 1 0 1>), while activation of control-2 202 may result in the generation of a second unique pulse train (e.g., <1 0 0 0 0 1 1 1 0 1>). Transmitter 208 may then convert the stream of digital pulses into a signal and transmit that signal in the direction in which pointing device 102 is pointed (typically toward display unit 108). Transmitter 208 may employ an infrared emitting diode whose natural transmission profile 210 may be used by receiver 104 to determine the pointing device's direction and speed of motion. If the natural energy profile of IR transmitter 208 is not acceptable (given, for example, the designed for distance between pointing device 102 and receiver 104), it may be shaped into the proper profile (typically Gaussian in the X and Y directions) by a plastic lens (not shown in FIG. 2).

In one embodiment of receiver unit 104, pointing device 102 motion in the X direction may be detected by two IR detectors (for example, photodiodes or phototransistors) mounted in the X plane, and in the Y direction by two IR detectors mounted in the Y plane. (By convention X and Y directions are perpendicular.) Detectors within a detector pair (X or Y) may be separated by, for example, 7 centimeters (cm), although detector spacing may depend upon a number of factors including the distance between pointing device 102 and receiver unit 104, the distance between receiver unit 104 and the device being controlled such as display unit 108, the energy profile of the pointing device's transmitter (e.g. IR emitting diode), whether a lens is used to modify the transmitter's energy profile, and whether the receiver uses a lens to focus the received signals. Output from the X direction detector pair and the Y direction detector pair may be processed to generate a signal indicative of pointing device 102's motion.

Figure 3:
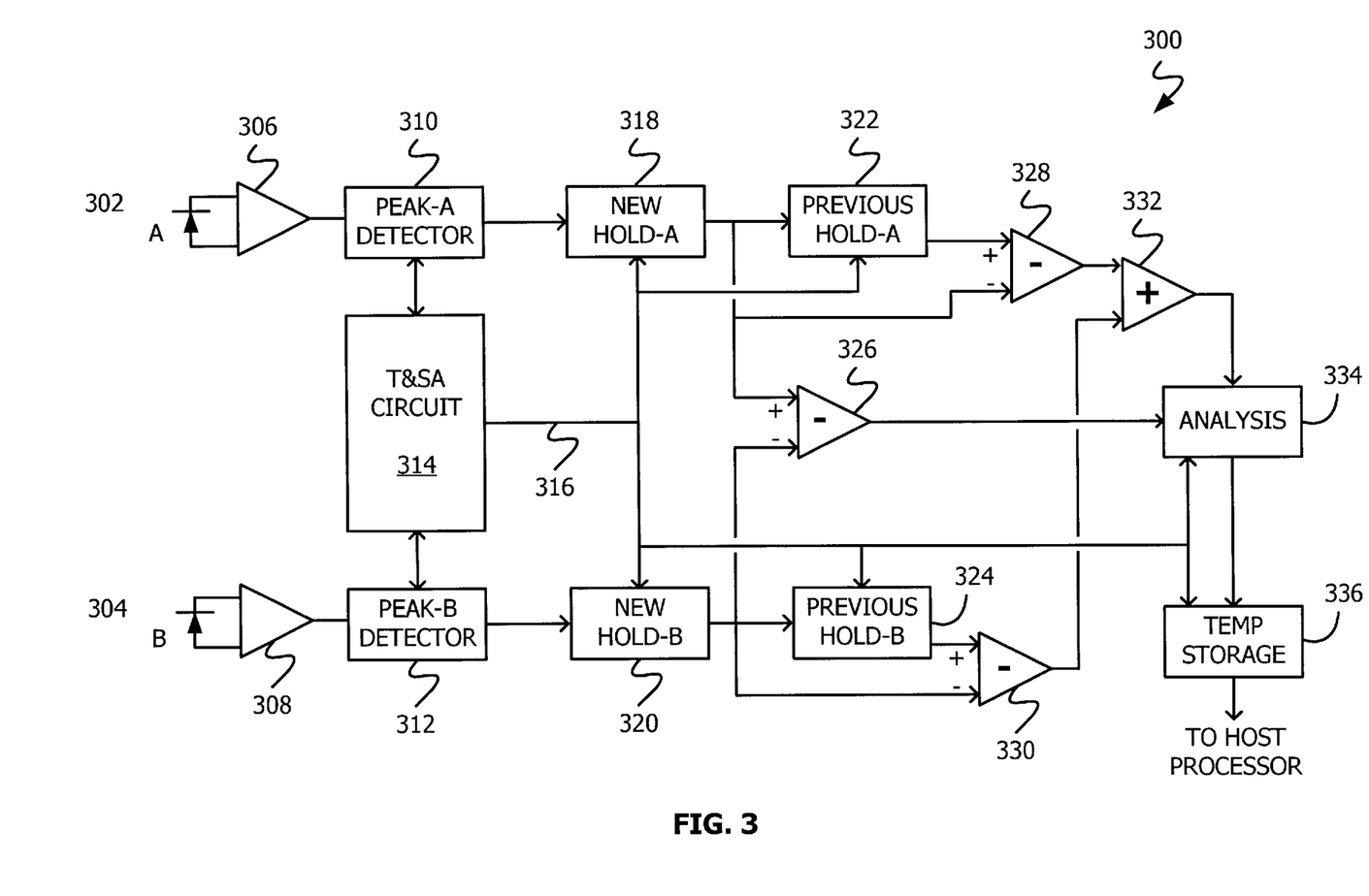
FIG. 3 shows a block diagram of a wireless receiver unit in accordance with one embodiment of the invention.

Referring to FIG. 3, processing circuitry 300 for one detector pair (e.g., an X direction photodiode or phototransistor pair) is shown in accordance with one embodiment of the invention. Photodiode A 302 and photodiode B 304 detect IR pulse trains (in the X plane) transmitted by pointing device 102. Amplifier 306 amplifies the signal detected by photodiode A 302 and amplifier 308 amplifies the signal detected by photodiode B 304. Following amplification, peak-A detector 310 and peak-B detector 312 capture the peak value of their respective received IR signals. In one embodiment, peak detectors 310 and 312 capture the peak of the first or last pulse in a received pulse train. In another embodiment, peak detectors 310 and 312 capture the peak value from an entire received pulse train. Regardless of which peak value peak detectors 310 and 312 are designed to capture, peak detectors 310 and 312 may also indicate the sequence of received pulses as a string of 1s and 0s to the timing and signature analysis (T&SA) circuit 314. For example, if the received pulse train represents the binary sequence <1 1 0 0 1 1 0 1 0 1>, peak detectors A and B (310 and 312) may indicate this sequence one pulse/bit at a time to T&SA circuit 114. (If peak-A detector 310 and peak-B detector 312 indicate a different sequence, this may imply that pointing device 102 is out of range to receiver 104.)

Figure 4:
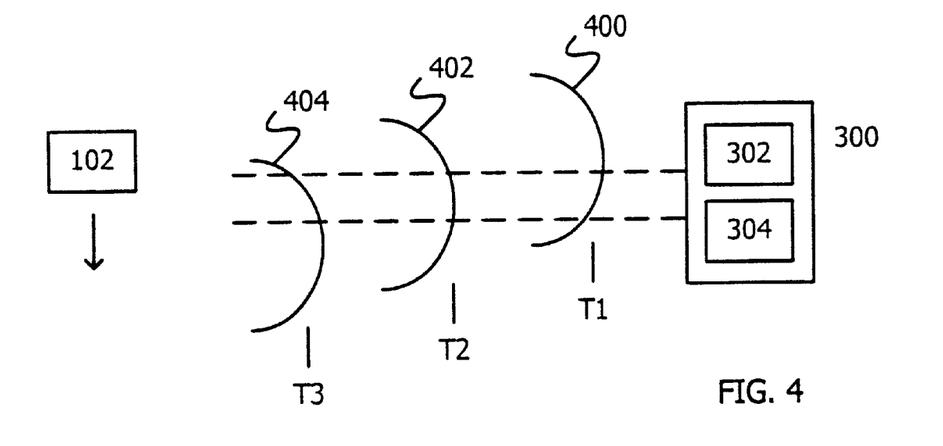
FIG. 4 illustrates a series of pulse trains as received by a pair of diode receivers in accordance with one embodiment of the invention.

A series of pulse train wavefronts and their reception by diodes A 302 and B 304 is shown in FIG. 4. At time T1 pointing device 102 may transmit a first pulse train 400, at a later time T2 a second pulse train 402, and at still a later time T3 a third pulse train 404. As shown, detector A 302 and detector B 304 may receive slightly different representations of the transmitted signals 400, 402, and 404 because of the detectors' physical separation. Wavefronts 400 through 404 may, for example, represent the unique digital pulse train <1 1 0 0 1 1 0 1 0 1>indicating that pointing device 102 is being moved from left to right.

Referring again to FIG. 3, T&SA circuit 314 evaluates the sequence of bits provided by peak detectors 310 and 312 to determine which pointing device control, 200 and/or 202 and/or 204, is currently activated and to signal reception of a complete pulse train on one or more control signal output lines 316. That is, T&SA circuit 314 characterizes a receive pulse train by determining if the received signal indicates activation of, for example, control-1 200, and/or control-2 202, and/or control-3 204. (T&SA circuit 314 may also trigger peak detectors 310 and 312 to capture and hold the peak value of a received pulse, e.g., the third pulse in a received pulse train.) In one embodiment of the invention, T&SA circuit 314 first detects control-1 200 activation (signaling, for example, pointing device 102 is in motion) before recognizing any other control activation's such as, for example, a left or right mouse button activation via control-2 202 or control-3 204. In another embodiment of the invention, T&SA circuit 314 may be a programmable control device such as a microprocessor or a microcontroller. In yet another embodiment of the invention, T&SA circuit 314 may be a custom designed state machine implemented, for example, using discrete logic or specially designed application specific integrated circuits (ASICs).

When T&SA circuit 314 determines a complete pulse train has been received, it may command new hold-A circuit 318 and new hold-B circuit 320 to record (e.g., latch) the current peak value in peak-A and peak-B detectors 310 and 312 respectively. (Circuits 310 and 318 may be the same circuitry, as may circuits 312 and 320.) Prior to this operation T&SA circuit 314 may also command (via control signal output lines 316) previous hold-A circuit 322 and previous hold-B circuit 324 to receive and store (e.g., latch) the value stored in new hold-A and new hold-B circuits 318 and 320 respectively. In this manner, new hold circuits 318 and 320 record a peak value associated with the currently received pulse train, while previous hold-A and previous hold-B circuits 322 and 324 record peak values associated with the preceding received pulse train.

Values stored in new hold-A 318 and new hold-B 320 circuits are provided as inputs to difference amplifier 326. In one embodiment, difference amplifier 326's output indicates whether output from new hold-A circuit 318 is greater than, less than, or equal to output from new hold-B circuit 320. If output from amplifier 326 is greater than zero, this may indicate that the detectors (e.g., 302 and 304) are detecting energy on the right side of the received pulse (e.g., the "bottom" half of the pulse as shown in FIG. 4). If output from amplifier 326 is less than zero, this may indicate that the detectors are detecting energy on the left side of the received pulse (e.g., the "top" half of the pulse as shown in FIG. 4). If output from amplifier 326 is equal to zero, this may indicate that the detectors are detecting energy from the center of the received pulse.

Difference amplifiers 328 and 330 provide signals representative of the difference between the new (i.e., output from circuits 318 and 320) and previous (i.e., output from circuits 322 and 324) peak values for each of the A and B signal pathways within processing circuit 300. Output from difference amplifier 326 and summing amplifier 332 are provided as inputs to analysis circuit 334 to determine the direction of pointing device 102 movement, the amount of that motion, and perhaps the speed of the motion.

Figure 5:
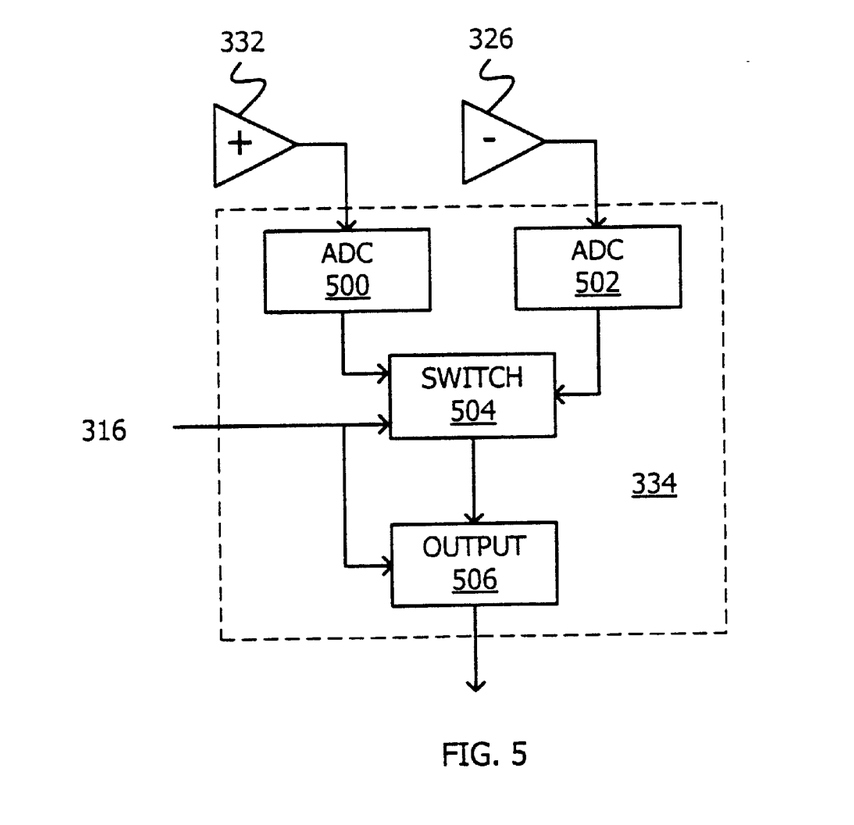
FIG. 5 shows an illustrative analysis circuit in accordance with the embodiment of FIG. 3.

Referring to FIG. 5, in one embodiment of the invention, analysis circuit 334 may include analog-to-digital converter (ADC) 500 and ADC 502, switch 504, and output circuit 506. By convention, ADC 500 and 502 transform the analog output signal from amplifiers 326 and 332 to a digital word (e.g., from 2-bits to 16-bits). Switch 504 selectively routes output from ADC 500 or ADC 502 to output circuit 506, depending upon T&SA circuit 314 control signal output 316. Output circuit 506 may generate a signal indicative of how much the pointing device has moved, the direction of that movement, whether the user has activated a control (e.g., control-2 202 or control-3 204), and perhaps the speed of the pointing device's motion. In one embodiment of the invention, output circuit 506 receives input from X direction, Y direction and, if implemented, Z direction processing circuits and, based on this input, generates a data packet in conformance with standard mouse data packet formats for transmission to a software mouse handler executing on a host processor.

In one embodiment of the invention, output circuit 506 determines pointing device 102 movement in a direction (e.g., the X direction or the Y direction) by correlating output from amplifiers 326 and 332 in accordance with Table 1. In Table 1, the '+' symbol represents a positive output value, a '−' symbol represents a negative output value, and a '0' symbol represents a null or zero output value. (It is noted that zero output does not necessarily mean absolutely zero output, but rather no output within a specified range of zero. The specified range will generally be a function of the characteristic of the relevant signals. For example, if amplifier 332 output may range from −12 volts to +12 volts, then zero may be represented by an output voltage of between approximately −0.1 volts and +0.1 volts.) In another embodiment, analysis circuit 334 may receive input from amplifiers 326 and either 328 or 330. In yet another embodiment, amplifier 332 may be replaced with a circuit that selects output from that amplifier (328 or 330) which is the largest (e.g., most positive).

TABLE 1

Output Circuit Operation

| Output from Amplifier 332 | Output from Amplifier 326 | Determined Direction of Motion |
|---|---|---|
| + | + | Left to Right Motion |
| + | − | Right to Left Motion |
| + | 0 | Left to Right Motion |
| − | + | Right to Left Motion |
| − | − | Right to Left Motion |
| − | 0 | Right to Left Motion |
| 0 | + | No Information |
| 0 | − | No Information |
| 0 | 0 | No Information |

Figure 6A:
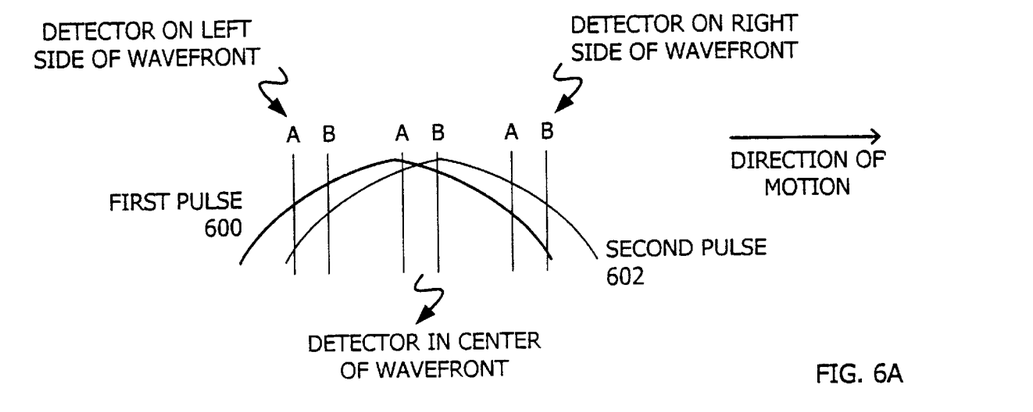
FIGS. 6A and 6B illustrate the difference signals that may be detected depending upon what part of a received signal is received.
Figure 6B:
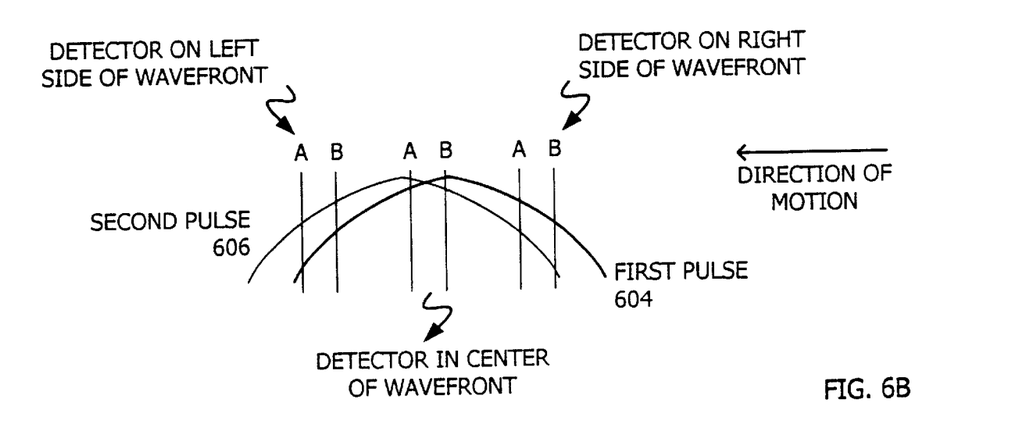

The various situations indicated in Table 1 are shown graphically in FIGS. 6A and 6B. FIG. 6A shows two pulses from pointer device 102 moving from the left to the right—as may be received by detectors 302 and 304 in each of the three possible positions. FIG. 6B shows similar information for a pair of pulses moving from the right to the left. As described before, pulses 600, 602, 604, and 606 represent wavefronts comprising a number of pulses. For example, control-1 200 may be automatically activated whenever pointing device 102 is in motion, causing pulse train generator 206 to periodically (e.g., every 10 milliseconds, ms) generate a unique pulse train which may then be transmitted by transmitter 208 to generate a wavefront (e.g., 600, 602, 604, or 606).

If movement in accordance with Table 1 is detected in the X direction, for example, a uniform displacement/movement in the X direction may be assumed. As repeated indications of movement in the X direction are received, the pointing device may systematically move, for example, a cursor across a display unit's screen. The same process may be used to track pointing device 102 movement in the Y and Z directions. It is further noted that amplifier 326 output represents the tangent of the detected wavefronts energy profile, while amplifier 332 output represents a change in position of the pointing device. Thus, by calibrating the energy profile of the transmitter and using output from amplifiers 326 and 332, the pointer device's speed of motion (as well as the pointer device's direction) may also be calculated.

Figure 7:
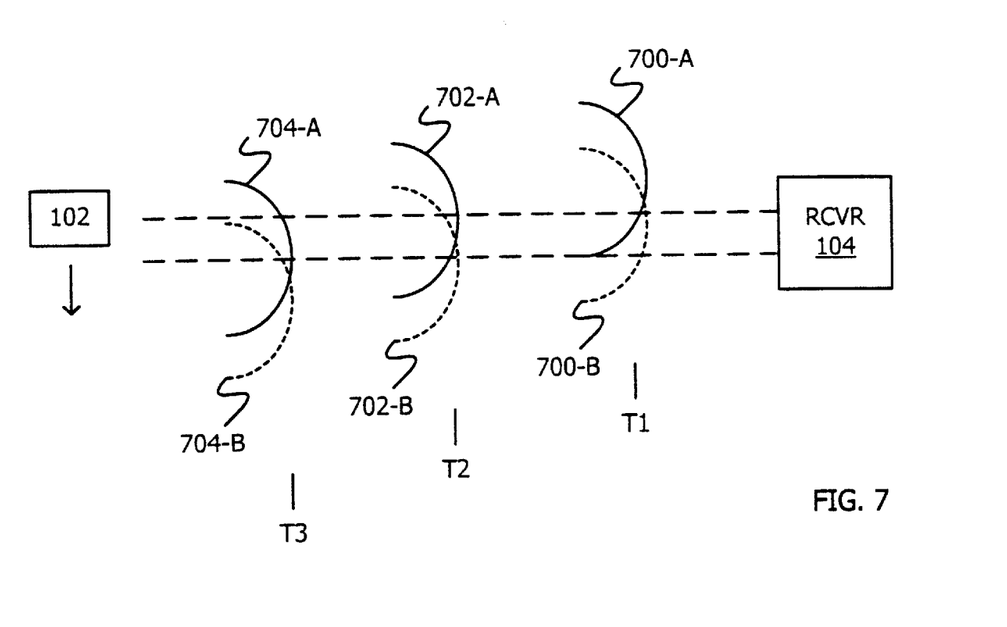
FIG. 7 illustrates another series of pulse trains in accordance with an embodiment of the invention using a two diode pointing device.

If the transmitted pulse train wavefronts (e.g., 600) are too broadly or too narrowly focused, slight motions of pointing device 102 may go undetected. For example, if the transmitted wavefronts are too broadly focused, small horizontal, vertical, and rotational movements of pointing device 102 may not be detectable at receiver unit 104 because the detectors (e.g., 302 and 304) may not be able to detect a difference between two substantially planar waves. For example, if transmitter 208 generates broad wavefronts and detectors are located at the center of the received waveform (see FIGS. 6A and 6B), small movements of pointer device 102 may not be detectable (see Table 1). On the other hand, if the transmitted wavefronts are too narrowly focused, receiver unit 104 (e.g., detectors 302 and 304) may not receive sufficient signal to detect. This latter case may be made more significant if pointing device 102 is not pointed toward receiver unit 104. By adding an additional transmitting device, such as another IR emitting diode, to pointing device 102 (at an X and Y angle slightly different from that of the original transmitting diode), these problems may be overcome. Two transmitting devices aligned as described above may generate slightly different pulse train wavefronts as shown in FIG. 7. For example, A wavefronts such as 700-A and 702-A may be generated by one diode, and B wavefronts such as 700-B and 702-B by another diode. Under these conditions processing circuitry may detect slight motions by independently processing A pulse train signals and B pulse train signals.

Figure 8:
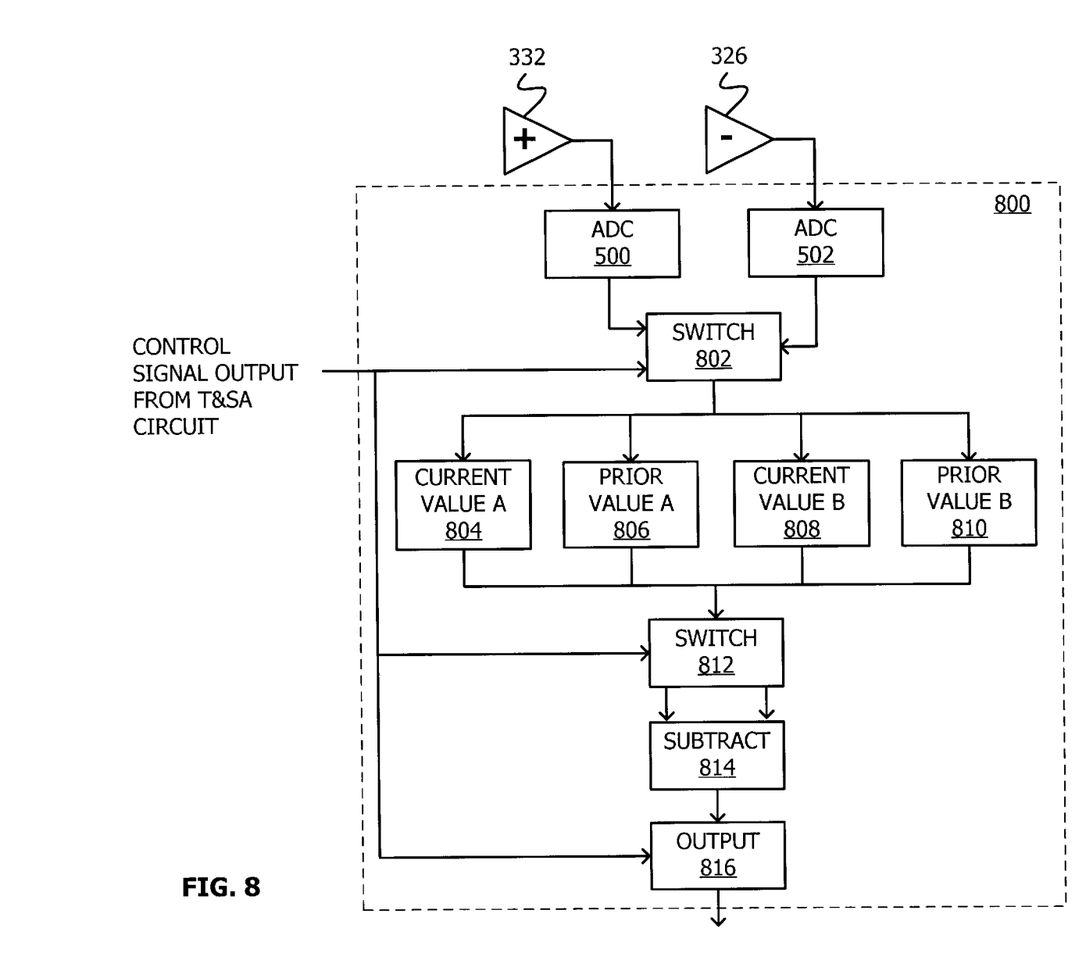
FIG. 8 shows an illustrative analysis circuit in accordance with another embodiment of the invention.

In an embodiment of the invention utilizing two pointing device transmitting elements, T&SA circuit may be modified to detect and indicate which of the transmitting devices (A or B) generated the received signal. Referring to FIG. 8, analysis circuit 800 in accordance with this embodiment of the invention may digitize amplifier 326 and 332 output as shown in FIG. 5. Switch 802 may selectively route ADC 500 and 502 output to one of four registers: current value A register 804; prior value A register 806; current value B register 808; and prior value B register 810. Wherein A registers 804 and 806 are used when control signal output from the T&SA circuit indicates output from amplifiers 326 and 332 is associated with a current received signal, and B registers 808 and 810 are used when processing output from amplifiers 326 and 332 associated with a prior received signal. Switch 812 selectively routes output from either A registers 804 and 806 or B registers 808 and 810 to subtraction circuit 814. Control signal output from T&SA circuit determines which of the A and B registers are so routed. Output circuit 816 may generate pointing device data packets for transmission to a host processor (e.g., pointing device driver) as described above (e.g., Table 1).

A two diode pointing device in accordance with the above description may also be used to track three dimensional (3D) motion. For example, pointing device motion in the X and Y directions would be processed as described above. Motion in the Z direction (i.e., perpendicular to the X and Y directions) may be represented by rotating the pointing device. In this embodiment, receiver unit 104 would include three processing units—one for each of the X, Y and Z directions.

Wireless pointing devices may include only enough circuitry to drive one or more transmitting devices (IR emitting diodes for example). Because of this, wireless pointing devices may be very rugged, small, and inexpensive. Wireless pointing systems (pointing device and receiving unit) may be configured to allow a user to point to, for example, a display unit rather than a receiver. Thus, wireless pointing devices in accordance with the invention may allow users to interact with the device being controlled/manipulated in a more natural manner than do current pointing devices.

Various changes in the materials, components, and circuit elements in the above described embodiments are possible without departing from the scope of the claims. For instance, a light sensing array (a linear sequence of two or more devices such as infrared emitting diodes) may be used instead of spatially separated receiver devices 302 and 304 shown in FIG. 3. Alternatively, a single two-dimensional light sensing array may be used instead of separate X direction and Y direction sensors. Furthermore, the invention is not limited to the use of infrared technology. For example, pointing device 102 and receiver unit 104 may be ultraviolet, visible light, or radio frequency (RF) devices.

In addition, a wireless pointing system in accordance with the invention may implement other pointing devices than a mouse or joystick. For example, one embodiment may provide mouse-like capability to a television remote control. This embodiment could provide computer interface capabilities for web-based or interactive television. In embodiments of this type, the number of pulses used to encode which button is activated may be adapted to coincide with the protocol already used by the remote control device.

What is claimed is:

1. A wireless pointing device receiver, comprising:
    a receiver to receive signals from at least two wireless pointing devices; and
    a control circuit to detect movement of each of said devices relative to said receiver, said control circuit including at least two detectors, said control circuit to compare inputs from said wireless devices to the detectors to detect movement of each device relative to said receiver.

2. The wireless pointing device receiver of claim 1, further comprising an output circuit, operatively coupled to the circuit, to generate a signal to a programmable control device indicative of operation of the wireless pointing device.

3. The wireless pointing device receiver of claim 1, wherein the circuit also detects the direction of relative movement of said device.

4. The wireless pointing device receiver of claim 1, wherein the signals are infrared signals.

5. The wireless pointing device receiver of claim 4, wherein the receiver comprises two infrared detectors.

6. The wireless pointing device receiver of claim 4, wherein the receiver comprises two infrared detector arrays.

7. The wireless pointing device receiver of claim 4, wherein the receiver comprises a two-dimensional array of infrared detectors.

8. A computer system, comprising:
    a bus;
    a host processor operatively coupled to the bus; and
    a first wireless unit operatively coupled to the bus, the first wireless unit including a receiver to receive signals from at least two wireless pointing devices, a control circuit to detect movement of each device relative to said receiver, said control circuit including at least two detectors to detect wireless signals from said wireless unit and to compare said signals to detect movement of each device relative to said receiver.

9. The computer system of claim 8, further comprising a second wireless unit operatively coupled to the bus.

10. The computer system of claim 9, further comprising an output circuit, operatively coupled to the first wireless unit and the second wireless unit, to generate a signal to the host processor indicative of operation of the wireless pointing device.

11. The computer system of claim 8, further comprising a wireless pointing device adapted to communicate with the first wireless unit.

12. The computer system of claim 8, wherein, the control circuit detects the direction of said device relative to said receiver.

13. The computer system of claim 8, wherein the characteristic is activation of a user operable control of the wireless pointing device.

14. The computer system of claim 8, wherein the signals are radio frequency signals.

15. A wireless pointing device receiver, comprising:
    a receiver to receive signals from at least two wireless pointing devices; and
    a control circuit to detect movement of each of said devices relative to said receiver, said control circuit including at least two detectors, said control circuit to compare inputs from said wireless devices to the detectors to detect movement of each device relative to said receiver and generate a signal indicative of each device's motion.

* * * * *